US011138539B2

(12) United States Patent
Sethi et al.

(10) Patent No.: US 11,138,539 B2
(45) Date of Patent: Oct. 5, 2021

(54) ROBTIC BUSINESS PROCESS AUTOMATION SYSTEM UTILIZING REUSABLE TASK-BASED MICROBOTS

(71) Applicant: Target Brands, Inc., Minneapolis, MN (US)

(72) Inventors: Mohit Sethi, Karnataka (IN); Natarajan Ramamurthy, Karnataka (IN); Prakash Mall, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 350 days.

(21) Appl. No.: 16/111,928

(22) Filed: Aug. 24, 2018

(65) Prior Publication Data
US 2019/0066018 A1    Feb. 28, 2019

Related U.S. Application Data

(60) Provisional application No. 62/550,062, filed on Aug. 25, 2017.

(51) Int. Cl.
*G06Q 10/06*    (2012.01)
(52) U.S. Cl.
CPC ... *G06Q 10/06315* (2013.01); *G06Q 10/0633* (2013.01)
(58) Field of Classification Search
CPC .......... G06Q 10/06; G06Q 10/06316; G06Q 10/103; G06Q 10/10; G06Q 10/0633; G06Q 10/06315; H04N 2201/0094; G06N 20/00
See application file for complete search history.

(56) References Cited

U.S. PATENT DOCUMENTS

| | | | | |
|---|---|---|---|---|
| 5,774,661 A | * | 6/1998 | Chatterjee | G06F 9/5038 709/203 |
| 5,960,404 A | * | 9/1999 | Chaar | G06F 9/5038 705/7.26 |
| 6,662,355 B1 | * | 12/2003 | Caswell | G06F 9/451 717/103 |
| 6,874,008 B1 | * | 3/2005 | Eason | G06F 9/451 709/201 |
| 7,120,896 B2 | | 10/2006 | Budhiraja et al. | |
| 7,249,195 B2 | | 7/2007 | Panec et al. | |
| 7,316,000 B2 | | 1/2008 | Poole et al. | |

(Continued)

OTHER PUBLICATIONS

Automation Anywhere Enterprise—Development Client—User Guide Automation Anywhere, Inc., Jun. 28, 2017 (Year: 2017).*

(Continued)

*Primary Examiner* — Scott L Jarrett
(74) *Attorney, Agent, or Firm* — Merchant & Gould P.C.

(57) ABSTRACT

A process automation platform and method for automating business processes are disclosed. The method can include defining a business process in metadata, and, based on that metadata, selecting microbots to perform micro-operations included in the business process. An event engine initiates execution of the business process using the microbots and manages data dependencies of the microbots within the process. Each of the plurality of microbots includes microbot metadata defining a micro-operation performed by the microbot, and execution of each of the plurality of microbots is initiated independently of the others of the plurality of microbots.

11 Claims, 9 Drawing Sheets

(56) References Cited

U.S. PATENT DOCUMENTS

| | | | |
|---|---|---|---|
| 7,562,339 B2 | 7/2009 | Racca et al. | |
| 7,577,934 B2 | 8/2009 | Anonsen et al. | |
| 7,653,592 B1* | 1/2010 | Flaxman | G06Q 40/00 |
| | | | 705/38 |
| 7,757,178 B2* | 7/2010 | Garg | G06F 9/451 |
| | | | 715/763 |
| 7,861,252 B2 | 12/2010 | Uszok et al. | |
| 8,015,541 B1 | 9/2011 | Srinivasan et al. | |
| 9,026,577 B1* | 5/2015 | Johnston | G06Q 10/0633 |
| | | | 709/202 |
| 9,852,220 B1* | 12/2017 | Guo | G06F 16/951 |
| 10,198,490 B2* | 2/2019 | No | G06Q 10/06 |
| 10,311,360 B1* | 6/2019 | Ares | G06F 16/24553 |
| 10,360,565 B2* | 7/2019 | Tehranchi | G06Q 30/018 |
| 10,452,674 B2* | 10/2019 | Diwan | G06N 3/006 |
| 10,606,687 B2* | 3/2020 | Purushothaman | G06F 8/30 |
| 10,654,166 B1* | 5/2020 | Hall | G05B 19/0426 |
| 10,733,329 B1* | 8/2020 | Ragupathy | G06F 21/45 |
| 10,802,453 B2* | 10/2020 | Allen, IV | G05B 19/0421 |
| 10,802,872 B2* | 10/2020 | Gopalan | H04W 4/203 |
| 10,855,625 B1* | 12/2020 | Viswanathan | H04L 51/18 |
| 10,860,905 B1* | 12/2020 | Gligan | G06Q 10/0633 |
| 2004/0083448 A1* | 4/2004 | Schulz | G06Q 10/06 |
| | | | 717/101 |
| 2004/0128182 A1* | 7/2004 | Pepoon | G06Q 10/10 |
| | | | 705/4 |
| 2004/0187089 A1* | 9/2004 | Schulz | G06Q 10/06 |
| | | | 717/101 |
| 2004/0205772 A1* | 10/2004 | Uszok | H04L 29/06 |
| | | | 719/317 |
| 2004/0221261 A1* | 11/2004 | Blevins | G06Q 10/06 |
| | | | 717/107 |
| 2004/0264811 A1* | 12/2004 | Yano | G06F 16/93 |
| | | | 382/306 |
| 2005/0165822 A1 | 7/2005 | Yeung et al. | |
| 2006/0074732 A1* | 4/2006 | Shukla | G06Q 10/06 |
| | | | 717/106 |
| 2007/0130365 A1* | 6/2007 | Rebert | H04L 67/12 |
| | | | 709/238 |
| 2007/0177195 A1* | 8/2007 | Rebert | H04N 1/00217 |
| | | | 358/1.15 |
| 2008/0010631 A1* | 1/2008 | Harvey | G06F 8/36 |
| | | | 717/131 |
| 2008/0127047 A1* | 5/2008 | Zhang | G06Q 10/06 |
| | | | 717/104 |
| 2008/0247004 A1* | 10/2008 | Yeung | H04N 1/00244 |
| | | | 358/486 |
| 2008/0288621 A1* | 11/2008 | Snell | G06Q 10/06 |
| | | | 709/223 |
| 2009/0007056 A1* | 1/2009 | Prigge | G06Q 10/10 |
| | | | 717/104 |
| 2009/0027718 A1* | 1/2009 | Suzuki | G06Q 10/00 |
| | | | 358/1.15 |
| 2009/0248461 A1* | 10/2009 | Bartsch | G06Q 10/06312 |
| | | | 705/7.27 |
| 2010/0131916 A1* | 5/2010 | Prigge | G06F 8/10 |
| | | | 717/104 |
| 2012/0079490 A1* | 3/2012 | Bond | G06F 9/5038 |
| | | | 718/103 |
| 2012/0296691 A1* | 11/2012 | Ethier | G06Q 10/0633 |
| | | | 705/7.27 |
| 2013/0100464 A1* | 4/2013 | Liu | G06F 3/1255 |
| | | | 358/1.9 |
| 2014/0351817 A1* | 11/2014 | Sawamura | H04N 1/00244 |
| | | | 718/102 |
| 2015/0160989 A1* | 6/2015 | Maes | G06F 9/541 |
| | | | 719/313 |
| 2016/0012366 A1 | 1/2016 | Srivastava et al. | |
| 2016/0019484 A1 | 1/2016 | Srivastava et al. | |
| 2016/0119285 A1 | 4/2016 | Kakhandiki et al. | |
| 2017/0269972 A1* | 9/2017 | Hosabettu | G06F 9/4843 |
| 2017/0270431 A1* | 9/2017 | Hosabettu | G06Q 10/06 |
| 2017/0352041 A1* | 12/2017 | Ramamurthy | G06F 40/226 |
| 2018/0054491 A1* | 2/2018 | Mankovskii | H04L 67/142 |
| 2018/0107461 A1* | 4/2018 | Balasubramanian | G06F 8/38 |
| 2018/0197123 A1* | 7/2018 | Parimelazhagan | |
| | | | G06Q 10/0633 |
| 2018/0345489 A1* | 12/2018 | Allen, IV | G05B 19/0421 |
| 2019/0015974 A1* | 1/2019 | Mummigatti | G06F 16/951 |
| 2019/0066018 A1* | 2/2019 | Sethi | G06Q 10/0633 |
| 2019/0147382 A1* | 5/2019 | Krishnamurthy | H04L 63/102 |
| | | | 705/7.26 |
| 2019/0155225 A1* | 5/2019 | Kothandaraman | G06N 20/00 |

OTHER PUBLICATIONS

Chappell, David, Introducing Blue Prism—Robotic Process Automation for the Enterprise Chappell & Associates, 2017 (Year: 2017).*

Lacity, Mary et al., Robotic Process Automation: The Next Transformation Lever for Shared Services Jan. 2016 (Year: 2016).*

Tuttle, Steven et al., Understanding LDAP Design and Implementation IBM, Redbooks, Jun. 2004 (Year: 2004).*

Botha, Reinhardt et al., Access Control in Document-centric Workflow Systems—An Agent Based Approach Computers & Security, vol. 20, No. 6, 2001 (Year: 2001).*

Tornbohm, Cathy et al., Market Guide for Robotic Process Automation Software Gartner, Dec. 5, 2017 (Year: 2017).*

IT Security for Digital Laborer Deloitte, 2017 (Year: 2017).*

Security Risks in Robotic Process Automation (RPA): How You Can Prevent Them CiGen RPA, Nov. 22, 2017 (Year: 2017).*

* cited by examiner

ROBTIC BUSINESS PROCESS AUTOMATION SYSTEM UTILIZING REUSABLE TASK-BASED MICROBOTS

CROSS-REFERENCE TO RELATED APPLICATIONS

The present application claims priority from U.S. Provisional Patent Application No. 62/550,062, filed on Aug. 25, 2017, the disclosure of which is hereby incorporated by reference in its entirety.

BACKGROUND

There have been substantial efforts in the area of process automation, and in particular use of computing systems to automate data processing and/or hybrid physical/data systems. These efforts have typically been organized around analysis of a particular business process, and determining a way in which that process can be automated, if executed in exactly the same manner as if that process were performed manually.

An automation approach that is a true replica of human interaction does not truly leverage the compute capabilities of such automation systems, hence limiting the advantages from automation. For example, automation approaches typically are constructed such that scripts or other code can be used to replace human operation of various subprocesses, and to guide an overall business process. For example, automation systems may be used to process data across multiple business applications, manipulate a graphical user interface to perform specific functions, or initiate physical processes. However, such automation approaches consider the overall process as a whole, and are used to "glue together" use of different applications in situations where processes are high volume and/or repeatable.

Such traditional approaches to process automation have drawbacks. For example, in some situations, one underlying application whose use is automated may change in some manner, such that the automation applied using that application is no longer compatible with the application. In such an event, the entire automation will be "broken" and would fail due to the error at one part of the process. The automation code would need to be corrected or recreated. Furthermore, execution of the automation typically occurs sequentially throughout the entire process, such that if a particular portion of the process requires substantial processing time, the throughput of the overall process is limited. Additionally, to the extent an overall process does fail, there are limited capabilities built into existing automation systems that provide for resuming a process after it fails.

Accordingly, for these and other reasons, improvements in the area of process automation are desirable.

SUMMARY

In summary, the present disclosure relates to a process automation platform and method for automating business processes. According to various aspects, one method can include defining a business process in metadata, and, based on that metadata, selecting microbots to perform micro-operations included in the business process. An event engine initiates execution of the business process using the microbots. Each of the plurality of microbots includes microbot metadata defining a micro-operation performed by the microbot and data dependencies of that microbot, and execution of each of the plurality of microbots is initiated independently of the others of the plurality of microbots.

In a first aspect, a business process automation system is disclosed. The business process automation system includes a business process execution platform executable on a computing system. The business process execution platform includes a process management engine, a microbot engine, and an event engine. The process management engine is configured to define each of a plurality of different business processes, the plurality of different business processes comprising processes including a plurality of operations executed on a plurality of different computing systems and software applications. The microbot management engine is configured to manage definitions of a plurality of microbots, the plurality of microbots including one or more microbots configured to interface with one or more of the plurality of different computing systems and software applications to perform at least a portion of the physical task. The event engine is configured to initiate execution of a business process defined in the process management engine by calling a selected plurality of the microbots to perform the business process, the microbots each performing a portion of the business process independently from other microbots. The event engine manages data dependencies within the business process and initiating use of each of the selected plurality of microbots based on the data dependencies.

In a second aspect, a method of automating business processes including one or more physical processes is disclosed. The method includes defining a business process in process metadata, the business process being a process that is executed repeatedly by an organization and including one or more inputs, one or more outputs, and a plurality of task-based operations, at least one of the task-based operations including a physical task to be performed on an object. The method further includes, based on the process metadata, selecting a plurality of microbots to perform micro-operations included in the business process, the plurality of microbots including a microbot configured to perform at least a portion of the physical task. The method also includes initiating execution of the business process from an event engine, the event engine managing execution of the plurality of microbots. Each of the plurality of microbots comprises microbot metadata defining a micro-operation performed by the microbot and data dependencies of that microbot. Additionally, execution of each of the plurality of microbots is initiated independently of the others of the plurality of microbots.

In a third aspect, a system includes a programmable circuit and a memory operatively connected to the programmable circuit. The memory stores a definition of a business process in process metadata, the business process being a process that is executed repeatedly by an organization and including one or more inputs, one or more outputs, and a plurality of task-based operations, at least one of the task-based operations including a physical task to be performed on an object. The memory further stores instructions that, when executed by the programmable circuit, cause the system to: based on the process metadata, select a plurality of microbots to perform micro-operations included in the business process, the plurality of microbots including a microbot configured to perform at least a portion of the physical task; and initiate execution of the business process from an event engine, the event engine managing execution of the plurality of microbots. Each of the plurality of microbots comprises microbot metadata defining a micro-operation performed by the microbot and data dependencies of that microbot. Execution of each of the plurality of microbots is initiated independently of the others of the plurality of microbots.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
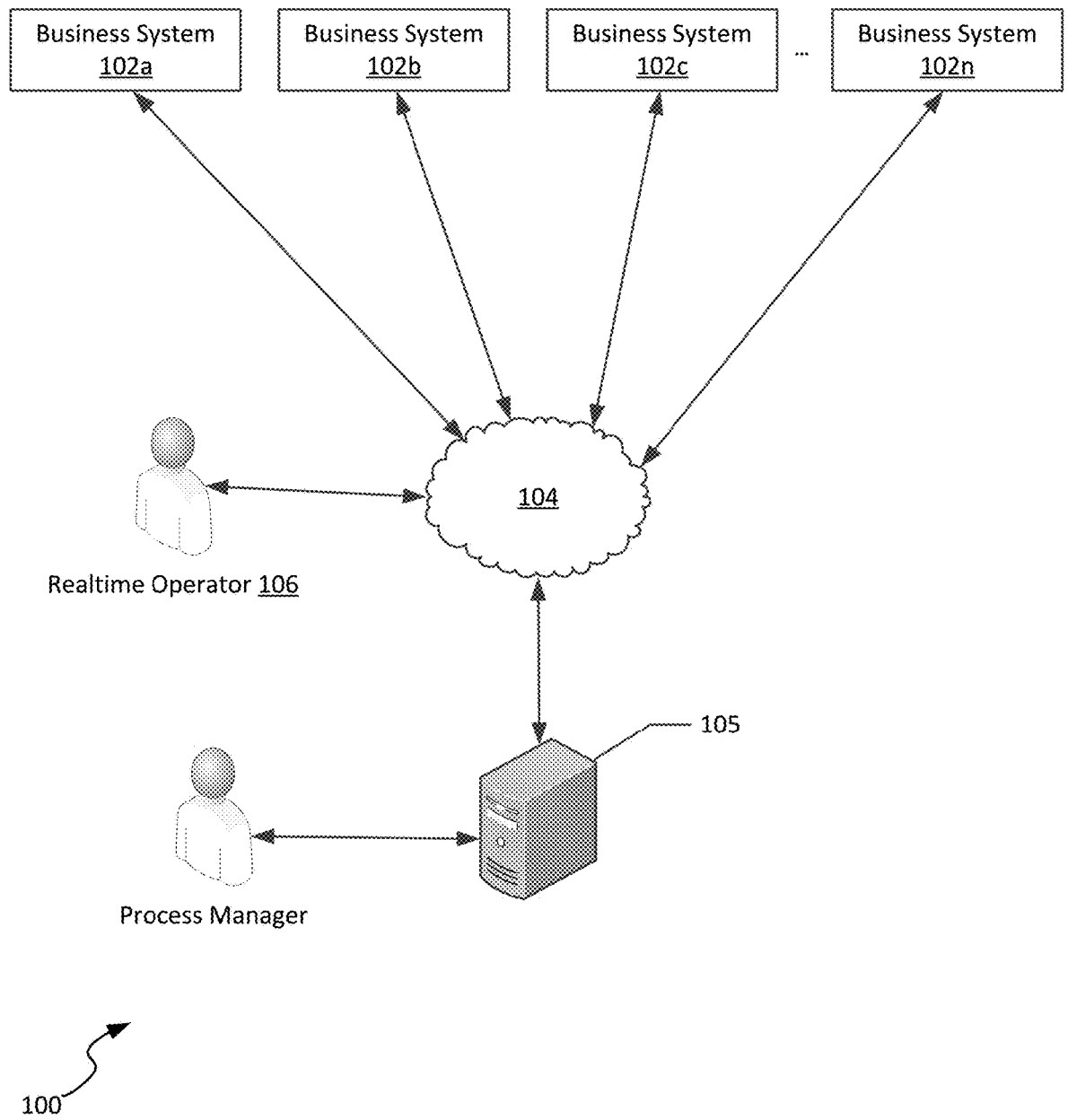
FIG. 1 illustrates an environment in which the methods and systems of the present disclosure can be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As briefly described above, embodiments of the present disclosure are directed to a system for process automation in which an overall process is decomposed into atomic actions each performed by an automation component called a "bot", which can be a software-based component, or mixed software and physical device-based component that is capable of accomplishing an atomic action within a process to be automated. Embodiments of the present disclosure also provide for a framework, or platform, within which such bots can be executed, which allows for use of customized and reusable bots in combination to execute an overall business process.

High-frequency business processes are often automated, but this is performed by considering the overall business process as it would be performed by a human, and those human steps are replaced by an automated process. However, as proposed here, a business process can be decomposed to a set of discrete actions, each performed by a bot. Because, in the context of the present disclosure, each business process is divided into a variety of different process steps, interfaces, user inputs, and other operations, each associated with a bot, in some instances, and as further described herein, the bots as implemented in the present disclosure can be referred to as "microbots", meaning bots that perform (relatively) small segments of an overall business process. Furthermore, rather than traditional automation processes in which automation modules span across applications and/or tasks used in a process, the microbots are also limited in "size" in this matter, because they are typically associated with or interface with a single application or perform a single type of action. Because microbots are limited in "size", they are generally considered to be stateless, in that they perform atomic tasks rather than overall processes. Accordingly, code segments that automate portions of an overall business process, for example by providing an automated interface to different software applications, physical subprocesses, or which themselves perform a physical portion of a previously-manual business process can be referred to herein as being constructed from a plurality of microbots logically interrelated to one another, although specific microbots may be more or fewer functions depending upon the requirements of any given business process and its current state of automation.

In example implementations, each microbot may have a function that can be called by an event engine to coordinate operation. Each microbot can execute in parallel or series, but is also aware of its metadata and data dependencies, in case such dependencies occur across microbot execution. The platform can prioritize microbot operations, and manage security in data access by the various microbots. Example microbots include self-learning capabilities, can parse and analyze text, and may have adapters for specific types of files (e.g., PDF, DOC, images, etc.). In some instances, microbots perform at least some physical processes (rather than simply data manipulation). Additionally, in some aspects, the microbots include assignable security levels and defined data interfaces.

Such coordination of discrete bots that perform portions of an overall process has a number of advantages over existing systems. For example, if one application used in a business process that requires multiple applications is changed, only a single microbot need be modified (or a new microbot created) for interacting with that application. Furthermore, the overall framework can monitor execution of the microbots which allows for microbots to be halted and/or restarted if they are unsuccessful in execution, and furthermore long-running bots can be replicated such that multiple executions of the same business process do not need to wait for the single microbot to finish the lengthy task before proceeding with a new record or portion of the process. Furthermore, because each microbot is independently executable and does not itself maintain data or process status, each microbot can easily be discarded and replaced "on the fly" such that the overall system can maintain proper operation through many types of errors that might occur over the course of execution of various business processes. Finally, microbots are easily scalable to meet throughput needs of particular business processes.

Furthermore, because many microbot operations are performed in many business processes (e.g., graphical manipulations, interfaces with particular applications, specific types of data analyses, etc.), microbots can be reused in different business processes, thereby simplifying automation of new business processes. In such cases, only the unique or custom operations included in a business process would need to be newly-automated.

Use of a microbot-based process to assist in execution of such high-frequency business processes provides substantial flexibility in defining the business process and enables a user to adapt a definition of a business process to cover any specific use cases which may arise that are not well-handled by an automation process. For example, in the area of invoice processing, a large organization may process over 100,000 invoices from vendors each week. Each of these invoices may or may not match to products received on shipping receipts; still further, what constitutes a "match" may be made more difficult because the item description on the invoice (or shipping receipt) is not standardized and may change over time. Therefore, determining a "match" may be an inexact process, since slight differences in color, sourcing, etc. may not matter to the organization, but may matter in other contexts. For example, an invoice mismatching a shipping receipt due to an order of shirts being wrong sizes may be unacceptable, whereas a mismatch between shirts having slightly different color may be acceptable. This may be the result of a number of microbot operations, including at least a scanning operation and a matching operation. The microbot-based process automation system described herein may allow a user to initially construct a business process in which both physical documents (invoice and shipping receipt) are scanned and compared, and an exact match is required; any non-identical descriptions or items may require user intervention or supervision. Over time, and based on either user refinement of the microbot performing the matching operation or artificial intelligence developing a decisioning model based on observation of the manual (user) matching process, a new matching microbot can be developed and inserted into the business process to improve operation and reduce the number of instances where user intervention is required.

Referring now to FIG. 1, an environment 100 is illustrated in which methods and systems described herein can be implemented. In general, the environment 100 represents a business process automation environment in which a plurality of business systems 102a-n are hosted by an organization. The plurality of business systems can take a wide number of forms. For example, business system 102a may be one or more computing systems hosting online transaction processing software that is used in the context of a billing and invoicing operation, while business system 102b may be a financial subsystem used to issue payments. Business subsystem 102c may be a financial document processing back-end subsystem used to digitize physical documents, such as checks, purchase orders, invoices, receipts, etc., for routing to other users or systems within the organization. Accordingly, subsystem 102c may often perform processes that are typically at least partially performed with human input. Other business systems hosting other business processes (e.g., other online transaction processing applications, inter- or intra-business communication modules) may be included as well (e.g., as shown to be in business systems 102a-n.

In the embodiment shown, the business processes are networked to a computing system 105 via a network 104. The network 104 can be, for example, a secured business intranet on which automation instructions can be securely transmitted to the various business processes 102a-n. This can include wired and/or wireless networks, and a variety of various types of security mechanisms included therein.

The computing system 105, in the embodiment shown, hosts a business process automation platform, as will be discussed in further detail below. The computing system 105, although illustrated for simplicity as a single computing device, can include a plurality of computing devices. The computing system 105 is accessible by a process manager, who can be, for example, a designer of a business process, who may be responsible for using the business process automation platform to define a process, automate that process by selecting one or more microbots for execution of the process and resources to be used by those microbots (e.g., workers, as discussed below) and to establish settings in the platform associated with, for example, security or administration of the process. The process manager can also determine a schedule for the process to be performed using the business process automation platform. In various embodiments, the process manager may be local to or remote from the computing system 105, but generally has access to the computing system 105 via a user interface presented within the business process automation platform.

By way of contrast to the process manager, a realtime operator 106 may be one or more person(s) who traditionally have access via the network 104 to the various business systems 102a-n. The realtime operator 106 may be a group of individuals responsible for executing various business processes using the business systems. For example, a realtime operator may be a group of individuals responsible for receiving goods and generating receipts for goods or services, receiving invoices, and processing payments associated with those invoices. The realtime operator may be required to match various goods from a single receipt to many invoices (or vice versa) and accurately track and process the payments made to ensure correspondence across the various steps of an inventory intake process. This process can be very time or labor intensive, and is repeatable, rendering it a possible candidate for automation. Other business processes, such as reporting across a plurality of online transaction processing (OLTP) systems for purposes of generating financial statements, or performing logistics operations regarding moving goods/services among locations within a company, also are possible business processes that are executed with high frequency, have a plurality of steps to be performed across different applications, and therefore could benefit from improved automation techniques.

Figure 2:
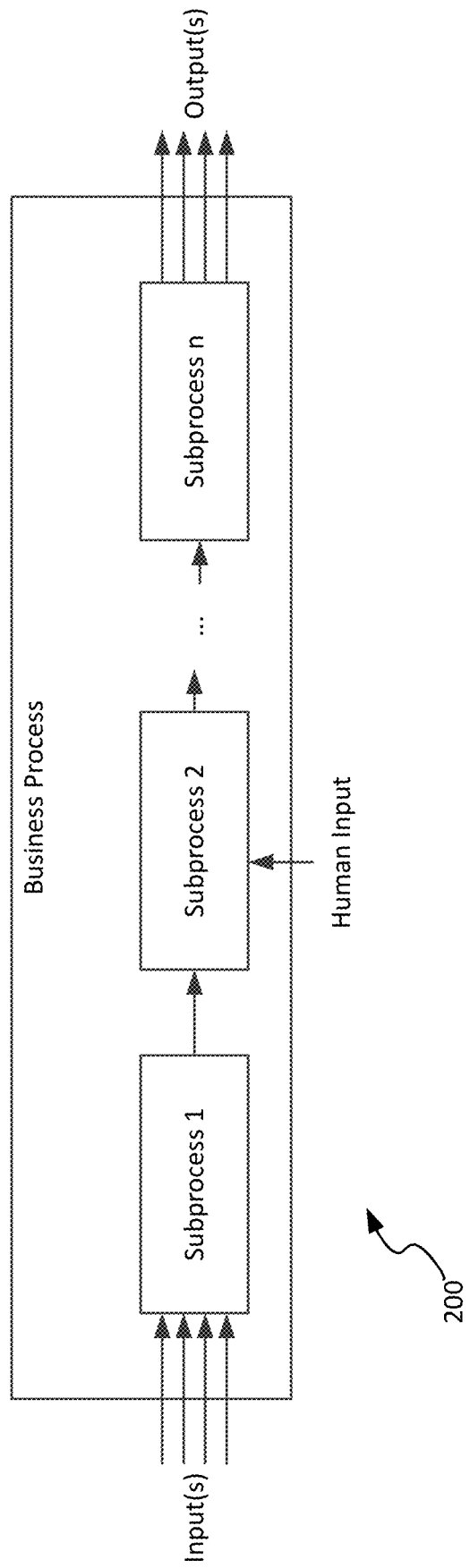
FIG. 2 illustrates an example business process, and a traditional methodology for conceptualizing and automating such a business process.

Referring now to FIG. 2, an example business process 200 and traditional methodology for automation of such a business process are discussed, in a general case. As noted above, and as illustrated in that Figure, a business process 200 may include a plurality of discrete steps, or subprocesses. The business process 200 may have a plurality of inputs to the process initially, or at some later time during the overall process. Each subprocess is usually considered sequentially, with one or more subprocesses requiring human input to manage that subprocess. Although the subprocesses may be computing manipulations, other subprocesses, such as document scanning, printing, or other physical operations may be performed as part of a subprocess as well. However, as noted in FIG. 2, the business process is generally considered to be a series of interconnected steps in which a first step in the business process (as the process would be executed by a human) would be performed, and its data provided to a second step, and so on, until the business process is completed. To automate such a business process 200, automation code can be provided that accompanies the business process, for example in the form of a script. The script may execute on one or more computing systems and can call the various applications to be executed; however some of the subprocesses may be performed on a different computer, or may be physical processes that are not necessarily amenable to script-based execution. Furthermore, if a relatively slow subprocess, or a subprocess that requires user input, is included in the overall business process 200, that business process can only be executed as fast as that slow-executing subprocess. This results in reserving resources for portions of the process that would otherwise be able to complete earlier, but for the fact that those process portions are waiting for slow-executing subprocesses in order to continue execution. Furthermore, an overall scripting solution to automation would fail if any of the subprocesses were to fail, e.g., due to abnormal data encountered, or due to a change in the application to which the automation is directed.

Figure 3:
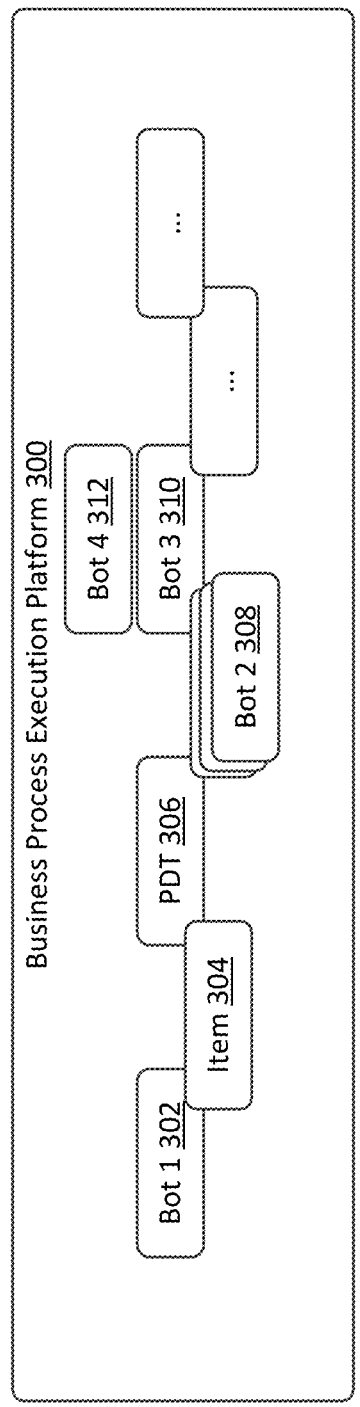
FIG. 3 illustrates a possible example decomposition of a business process and use of microbots for performance of the business process, according to an example implementation.

Referring now to FIG. 3, a possible example decomposition of a business process is shown using microbots for performance of the business process, according to an example implementation. As illustrated, a business process execution platform 300 hosts a plurality of bots that can be used to execute specific portions of an overall process. These bots, or microbots (as explained above) can execute specific portions of the overall process. It is noted that the microbots do not necessarily correspond to the subprocesses described in connection with FIG. 2; rather, the microbots are defined according to discrete tasks that can be performed on a, preferably, reusable basis, such that each microbot can be stored in a library and reused for other business processes. Still further, each microbot is defined to be stateless, in that each has a defined input interface and output interface (e.g., defining a structure of data or objects on which the microbot will operate), but does not define conditions under which that microbot will execute; rather, supporting infrastructure will selectively call microbots for execution. Accordingly, where subprocesses may, for example, relate to calculating a specific figure in a finance application, transferring data to a separate application or platform, and issuing a check or funds transfer from that separate application, microbots may be associated with more granular or re-usable tasks or portions of a process, such as providing a data interface to a particular accounting application, performing a specific GUI manipulation, applying security to data retrieved from an application, performing a mathematical operation on data, or initiating a physical process based on that data. Each microbot will generally not have knowledge of the overall process, but merely will have a set of expected inputs, a defined output, and a defined process to be performed, as described further below in connection with FIGS. 5A-5C.

In the specific example shown, a process may be decomposed into portions that can be accomplished using, e.g., Bot 1 302, a data item 304, PDT 306, Bot 2 308, Bot 3 310, Bot 4 312, and so on. As illustrated, the business process execution platform 300 can initiate execution of each of the microbots in whatever order desired, so long as the business process execution platform 300 manages data dependencies among those microbots. Furthermore, to the extent a particular microbot must perform a large number of operations, or may take a long time to execute, the business process execution platform 300 can instantiate multiple instances of that microbot to improve throughput. Accordingly, in the example shown, there may be some data dependencies among Bot 1 302, data item 304, PDT 306, and Bot 2 308. However, at Bot 1 302, multiple instances are called by the business process execution platform 300, to ensure throughput at that portion of an overall business process. Furthermore, because Bot 3 310 and Bot 4 312 may not have input data dependencies (e.g., each may perform separate calculations or manipulations from different applications based on the output of Bot 2 308 that are later merged), both of those bots 310, 312 can be called simultaneously, thereby further improving throughput and performance of the overall process.

As briefly noted above, because each bot, or microbot, is associated with a small portion of the process, process failures can be handled more readily. Because each microbot will pass processed data back to the business process execution platform 300, the platform can use data received from a previously-executing microbot and restart a bot in case of failure. Furthermore, if microbot failure is due to a changed interface within an underlying application to be automated, that microbot can be replaced within the overall system without recreating the entire business process automation. Furthermore, each microbot can have customized security features associated therewith, such that each microbot associated with a particular application can gave adequate access rights to the data associated with that application, but the microbot can secure (or remove sensitive data) prior to passing that data back to the business process execution platform 300 so sensitive data is not shared across applications (which would also traditionally not be possible with business automation systems, which operate as a whole automating entity).

Figure 4:
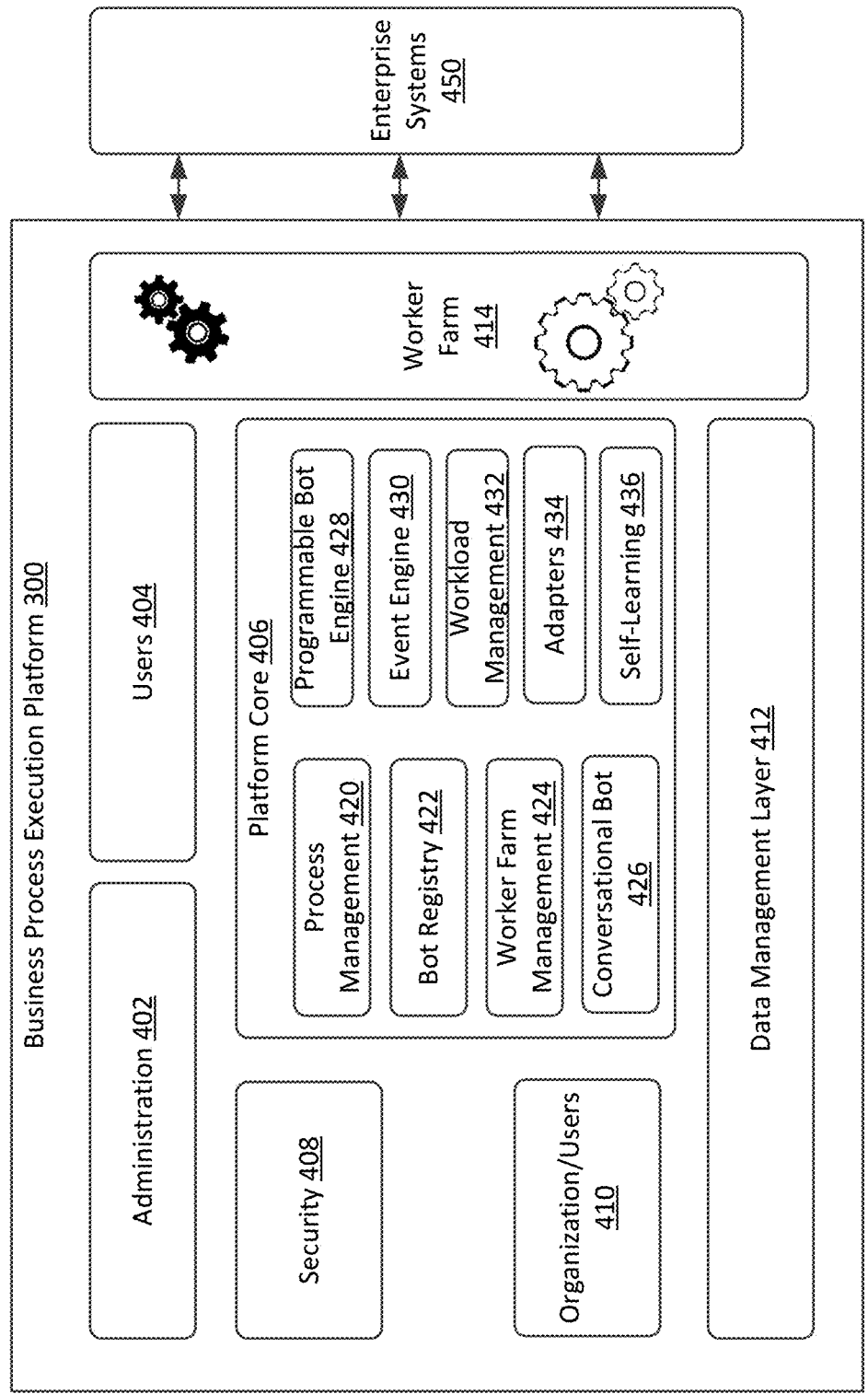
FIG. 4 illustrates a business process automation system, according to an example embodiment.

Referring now to FIG. 4, details regarding a business process automation system 400 are shown, including a business process execution platform on which such a system can be implemented. In the example embodiment as illustrated, the business process execution platform 300 is implemented on one or more computing systems, such as the system 105 of FIG. 1, as implemented on the computing device of FIG. 8. The business process execution platform 300 interfaces to a plurality of enterprise systems 450, for example business systems 102a-n as discussed above in connection with FIG. 1. The business process execution platform 300, referred to also herein simply as platform 300, can be used to host a plurality of different automations for business processes and concurrently manage execution of those processes at different priorities, security levels, and complexities.

The business process execution platform 300 includes, in the embodiment shown, an administration module 402, a users module 404, a platform core 406, a security module 408, a user management module 410, a data management layer 412, and a worker farm 414. Other modules or components of the business process execution platform 300 could be used as well, and different organizations of modules and/or data could also be utilized.

The administration module 402 allows an administrator of the business process execution platform 300 to view and adjust execution of the platform itself, for example to manage system resources, assess operation of automated tasks, etc. The users module 404 presents a user interface at which a user can for example, define processes, microbots, interfaces to external applications, etc., which will be modified in the platform core 406.

The platform core 406 manages calling and execution of various microbots based on a definition of which microbots are to be involved in performing a particular business process. Within the platform core, the business process execution platform 300 includes a process management module 420, a bot registry 422, a worker farm management module 424, a conversational bot 426, a programmable bot engine 428, an event engine 430, a workload management engine 432, one or more adapters 434, and a self-learning bot 436. Details regarding each of these components of the platform core 406 are provided below.

The security module 408 manages data security within the business process execution platform 300. In particular, the security module 408 will manage data access rights for each of the microbots and workers included in the platform, to ensure that correct microbots and/or workers can access business systems as required to automate desired business processes. The security module 408 can, for example, be configured to ensure compliance with applicable data security laws and regulations, for example by removing personally-identifying information from data ingested by the platform 300 via the microbots. The security module 408 can also set separate security levels for various microbots' access to data retrieved from different business systems.

The user management module 410 manages access to the business process execution platform 300, for example by one or more process managers as illustrated in FIG. 1. The administration module 402 can manage permissions for each process manager to view, create, modify, or remove definitions of processes, microbots, and interfaces to external applications, data, or systems.

The data management layer 412 manages data provided to the platform 300 by the various microbots included in the platform core 406. For example, the data management layer 412 can store data at various stages through a business process, thereby allowing failed microbots to restart using the same data, and to store overall results of a business process.

The worker farm 414 represents a set of computing and/or physical resources that can be used by the microbots to achieve tasks included in a business process. In some cases, the worker farm 414 can include one or more computing systems. In other cases, the worker farm 414 can also include electromechanical systems and special-purpose computing systems that are specifically configured for robotic, physical operations (e.g., document processing operations). In still further example cases, the worker farm can include computing systems having different capabilities (e.g., different applications and/or operating systems) so that they can be used for different purposes.

Within the platform core 406, the process management module 420 coordinates among the bot registry, workload management engine, and event engine to ensure coordination of microbots to accomplish business processes. The process management module 420 can receive definitions of processes (e.g., via the user interface) and store those process definitions in metadata, such that each process can be triggered (e.g., by the event engine 430) to initiate use of microbots to perform a specific process.

The bot registry 422 stores a description of each of the microbots managed in the platform 300, so that each of the microbots can be selected for execution as part of execution of a business process. The bot registry acts as a centralized organization location for all microbots, so users can select appropriate microbots for use in automating business processes. It is noted that in many cases, the microbots can be general-purpose microbots; however, some special-purpose microbots The worker farm management module 424 tracks the available resources in the worker farm 414, and allocates workers from the worker farm to assist in execution of business processes. For example, a worker from the worker farm may have installed on it an application for data processing based on data stored in a database within one of the enterprise systems 450; in such an instance, a microbot may be called to initiate execution of the worker, with another microbot acting as an interface (e.g., an adapter, as discussed below) to retrieve data for processing.

The conversational bot 426 is a particular microbot type that can be used for conversational processes. For example, the conversational bot 426 can prompt communication with a third party user, for example to obtain information that is to be included in a report generated by a business process, or to obtain direction as to how to complete a business process. Output from the conversational bot 426, as well as other microbots, can be sent to and managed by the data management layer 412 to further inform how to continue automated execution of a business process.

The programmable bot engine 428 calls various microbots for execution according to the metadata used to define each business process. The programmable bot engine 428 coordinates with the event engine 430, which manages the state of execution of a process via events that occur within the platform 300, which are updated as microbots are called for execution.

The workload management engine 432 supervises execution of business processes (via the programmable bot engine 428 and event engine 430) to determine workloads and process issues, and manages throughput issues accordingly. For example, the workload management engine 432 may elect to assign additional workers to a particular process given the likelihood that the process will require substantial resources, or may elect to instantiate multiple versions of a microbot to improve throughput of a particular portion of a process. In example embodiments, the workload management engine 432 manages a queue of work to be performed by the platform 300 to determine the resources to be assigned.

The one or more adapters 434 correspond to types of microbots that connect to remote systems or enterprise systems 450, for example to integrate functions external to the business process execution platform 300. Adapters can also correspond to interfaces to specific types of files (e.g., PDF, DOC, images, etc.).

The self-learning bot 436 generally corresponds to a bot type that can learn from human interaction and adjust/update processing according to observed human behavior. This can, for example, be implemented using neural networks or other learning models, and can track a current state, human input, intended output state, and confirming input from the user (e.g., approval or validation). The self-learning bot 436 can also generate one or more recommendations based on the current state of the overall platform 300, for example to provide recommendations for candidate processes for automation given the current collection of microbots available for use in automation. This can include generating recommendations for automating parts of processes, to reduce an extent of user activity in performing such fully- or partially-automated processes. This may allow a user to develop an improved microbot that makes decisions based on such a learning model, which may have the effect of reducing the amount of user interaction within a business process that is required (i.e., reducing the number of instances of the business process that are unable to be handled by a microbot and therefore require user review/action).

Referring to FIG. 4 generally, it is noted that not all business processes will utilize all portions of the platform core 406; rather, the specific engines used, like the specific microbots used, will vary depending on the number of business processes, and the number of instances of each business process, that are being performed at a particular time.

Figure 5:
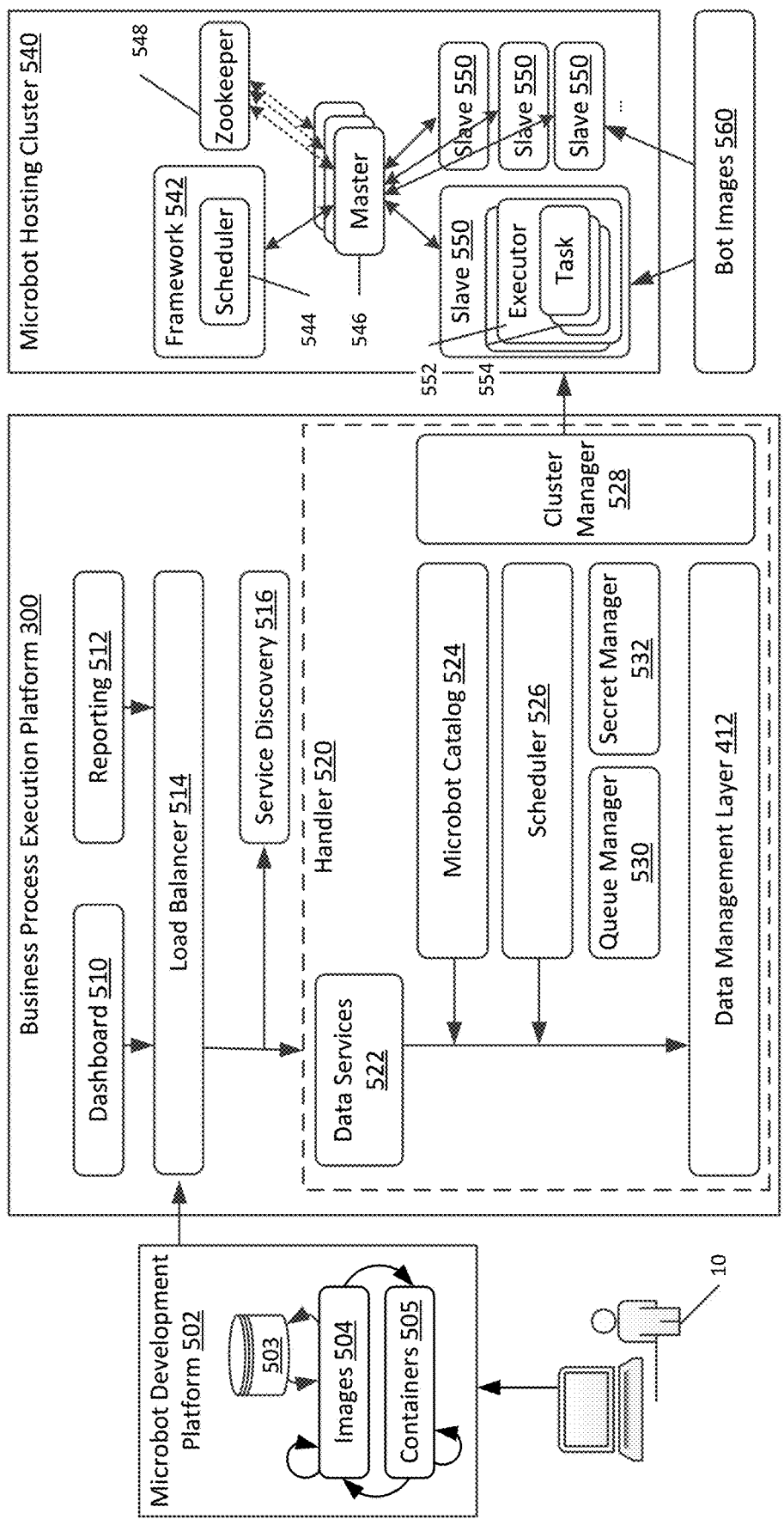
FIG. 5 illustrates a business process automation environment in which the business process automation system of FIG. 4 can be implemented.

Referring to FIG. 5, additional details regarding a business process automation environment 500 in which the business process automation system of FIG. 4 can be implemented. The environment 500 allows microbots to be developed and deployed within a business process execution platform 300 as discussed in FIG. 4; however, where FIG. 4 illustrates functional operation of such a system, the environment 500 depicts physical layout details.

In the example shown, a developer 501 can interact with a microbot development platform 502. The microbot development platform will store definitions of microbots in a database 503, and can retrieve such microbots using a graphical user interface to develop master images 504 and containers 505 for those images. The containers 505 can be used for development of images built using a graphical tool, which are then stored back into the database 503 as complete.

In example embodiments, database 503 may be a local database or a remote, cloud-based database configured to securely store definitions of microbots for retrieval to be used in business processes on an as-needed basis.

When microbots are complete and available for use, they can be published to the business process execution platform 300. The business process execution platform includes a dashboard 510 and reporting interface 512 interfaced to a load balancer 514. The dashboard 510 allows a user to monitor the microbots available and to define processes that can be performed using microbots. The dashboard 510 further allows a user to view executing processes (e.g., processes being executed in a microbot hosting cluster 550), and can include scheduling facilities for scheduling execution of business processes, and start/stop micrbots on a per-bot basis within a process (e.g., for troubleshooting or other purposes). The reporting interface 512 provides operational information to the user as well, including a number of microbots being used to perform a process, number of processes completed, a completion rate, a rate at which a process fails, or a rate at which user input is required into the process to complete the process. In addition, the reporting interface 512 may include one or more bot analytics tools, e.g., to detect bottlenecks in defined business processes, critical points at which specific microbots fail and reasons for such failure, and automated identification of specific areas of improvement of such bots (e.g., including through use of artificial intelligence/learning models to improve microbot decisionmaking). Other types of reporting tools may be included as well.

In example implementations, user access to the dashboard 510 and/or reporting interface 512 may be controlled based on user roles. For example, certain developer users may be allowed to develop microbots and add those microbots to a pool of available microbots; other users may be allowed to access microbots and define usage within a business process. Still further, other users may be allowed to initiate execution of business processes, but may not have access to edit the process or microbots included therein. Still further, some users may have access only to the reporting interface 512 for certain business processes, allowing the user to view statistics regarding execution of those specific business processes (e.g., % executed successfully, elapsed time, etc.).

In the example shown, the load balancer 514 manages execution of business processes defined using the dashboard 510, e.g. by calling one or more handlers 520. Each handler 520 includes a cluster manager 522 that manages execution of a cluster 540, which hosts microbots during execution. The load balancer 514 may assess, based on service discovery system 516, what resources are available at the business process execution platform 300, and instantiate a handler 520. Although one handler is depicted in FIG. 5, it is noted that multiple handlers may be included in the platform 300, e.g., based on a number of clusters 540 that are to be managed by the platform 300.

In the embodiment shown, each handler 520 includes a data services module 522 that provides definition of specific data connections for databases containing data to be operated on to a data management layer 412 (e.g., corresponding to an instance of the data management layer 412 of FIG. 4). In addition, a microbot catalog 524 and scheduler 526 define the available microbots for use in the process to be executed via the handler 520, as well as a scheduled timing for execution of that process. The scheduler 526 can be used to trigger operation of a particular business process in a cluster 540, via communication to the cluster 540 via a cluster manager 528.

In addition, the handler 520 includes a queue manager 530 and a secret manager 532. The queue manager 530 manages a queue of processes to be performed and/or resources (e.g., microbots, etc.) that are awaiting operation, while the secret manager 532 controls information to be used in the business process execution.

Overall, the handler 520, and particularly cluster manager 528, is associated with a cluster 540. Each cluster has a corresponding framework 542, which hosts a scheduler 544 useable to initiate execution of a business process by triggering execution of one or more task execution components. In the example shown, the scheduler 544 initiates communication with a master task execution component 546, which is allocated from a master task execution components that are managed by a zookeeper 548. The zookeeper 548 manages free/used status of task execution components, and can allocate free task execution components to business processes on an as-available basis.

In the embodiment shown, a master task execution component 546 is linked to one or more slave task execution components 550. Each of the task execution components includes one or more executors 552, with each executor capable of hosting execution of one or a plurality of tasks 554. The tasks are performed within executors 552 by retrieving microbot images 560, e.g., from database 503, in response to selection from microbot catalog 524. Accordingly, selected microbots can be sequenced by a scheduler 544 and executed in a sequence defined in the platform 300 and enforced by the scheduler and relationships among the execution components 546, 550.

Figure 6A:
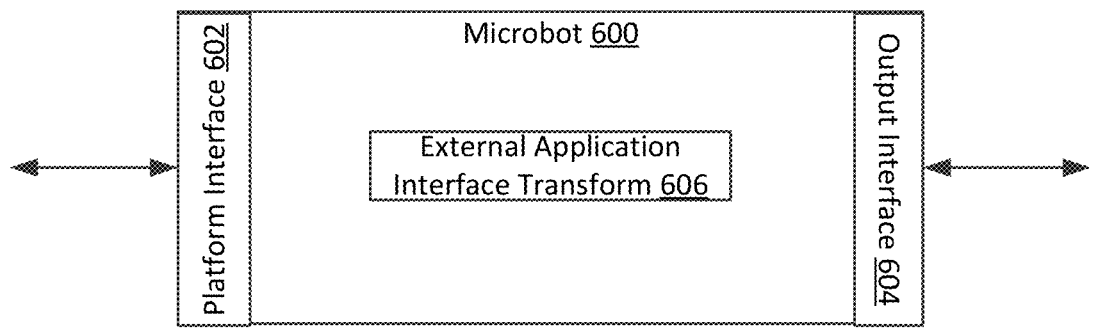
FIGS. 6A-6C illustrate example microbots useable within the business process automation system of FIGS. 3-5.

In example embodiments, while the handler 520 and platform 300 overall may be managed within an organization, it is noted that each cluster may be instantiated as a cloud-based set of computing resources useable to perform any required business processes. The Referring now to FIGS. 6A-6C, example illustrations of microbots useable within the platform 300 of FIGS. 3-5 are provided. FIG. 6A illustrates a first possible microbot 600 that includes a platform interface 602, an output interface 604, and external application interface transform code 606. The platform interface 602 and output interface 604 generally correspond to a set of preconditions to execution of the microbot and postconditions following execution of the microbot; these can include a particular state of data or state of an application on which the microbot may operate. The event engine can determine when appropriate preconditions are present to call a particular microbot, and can also determine when appropriate postconditions are present following operation of the microbot, to assess whether the microbot performed its task within the overall business process appropriately.

In the example shown, the microbot 600 is configured to perform a transform on external application data; as such the microbot 600 has a platform interface that defines the data format it expects as input, and an output interface that is configured to either (1) output processed data, or (2) interface with an external data storage system or application to direct processing of that data with the application to which the microbot 600 is interfaced.

In an example implementation, the microbot 600 is constructed using computer executable code, for example using JavaScript Object Notation (JSON) code for simple creation and deployment for execution; however, other languages can be used for rapid creation and deployment. In general, each microbot's preconditions and postconditions, and optionally its function, can be defined in metadata as well such that the event engine can readily access these conditions for each microbot to assess whether execution of the microbot can be initiated, based on the state of execution of the process. The implementation code for the microbot (e.g., external application interface transform code 606, in the case of microbot 600) can be constructed to have a security level that is specific to that microbot, such that each microbot has its own assignable security level. The security level for each microbot can be based, for example, on the type of data to be handled by the microbot, access rights to specific applications that would be required of the microbot, and network requirements within an organization.

Figure 6B:
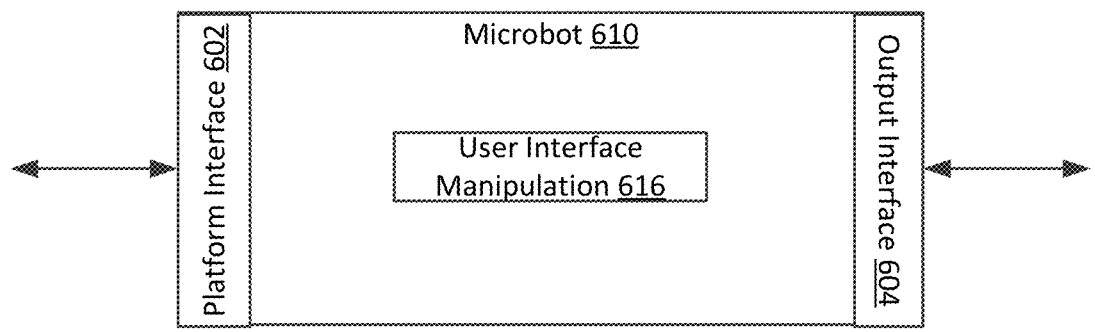

FIG. 6B illustrates a second microbot 610; in this case, microbot 610 also has a platform interface 602 and an output interface 604, which are specific to the data types of expected inputs and outputs from that microbot 610. In this example, the microbot 610 includes a user interface manipulation component 616. Accordingly, the microbot 610 can be used to manipulate a user interface of a particular application in a specific manner; for example, to operate a user-facing application to perform one or more specified functions. The user interface manipulation component 616 can output instructions to operating system via external interface to mimic user operation by selecting one or more options that are displayed on a user interface of a network system, based on specific data received at the platform interface (e.g., types and values of information to be provided via the user interface).

In some examples, the second microbot 610 can partially replace a human for purposes of automation. In such examples, the microbot 610 can perform one or more steps in terms of graphical interface manipulation, but due to variability in the process or other factors, one or more steps may preferably be performed by a human. In such cases, a wait state may be performed by the microbot 610, for example to approve, check, or validate action of the microbot before proceeding, either with further operation by microbot 610 or by other microbots used in an overall process.

Figure 6C:
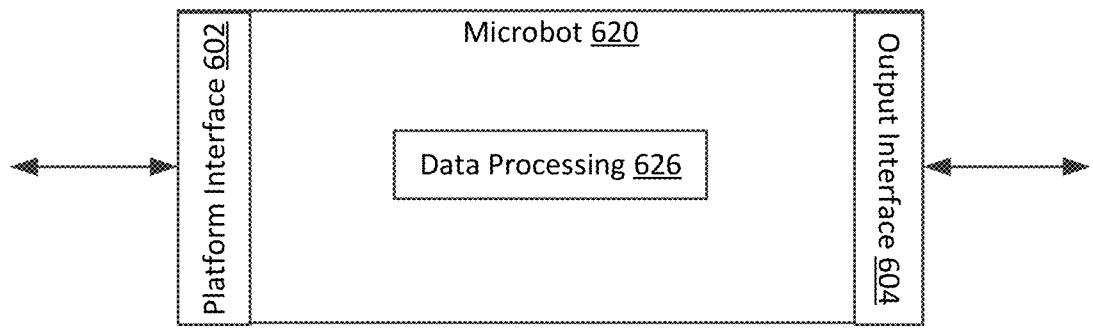

FIG. 6C illustrates a third microbot 620 configured for data processing; in this case, microbot 620 includes a platform interface 602, output interface 604, and a data processing component 626. The third microbot 620 is configured to process data passed to it by the platform 300, so it The data processing component 626 may perform one or more operations on data received at that microbot from a specific application, for example one or more mathematical calculations, reformatting of data records, securing or redacting of records for compliance with privacy laws, or other operations. In a possible example, the microbot 620 can be configured to perform image character recognition on image data that is captured (e.g., by a prior portion of a business process guided by a different microbot). This could allow for verification or processing of handwritten text. Other types of microbot functions, such as parsing and analysis of text based on a machine-learning model, could be implemented within data processing component 626 as well.

It is noted that the microbot types of FIGS. 6A-6C are merely examples and that numerous other types of microbots or granularities in which business processes could be subdivided are possible as well. Furthermore, as illustrated in the above example microbots, each of the microbots has a definition of input data expected and output data to be delivered, but does not include dependencies on other microbots; rather, when and whether a microbot is called is left to the platform 300 overall. This allows each microbot to be integrated into a plurality of different business process flows without having to modify those microbots to define dependencies in each microbot; rather, those would be defined in the process and event metadata as defined in the platform 300 itself. Further, microbots are not self-executing, but rather rely on the platform 300 to call each microbot for execution and for providing underlying resources for execution (e.g., access to relevant platforms and/or workers to perform specific tasks). Microbots merely represent a definition of granularity for a process.

Figure 7:
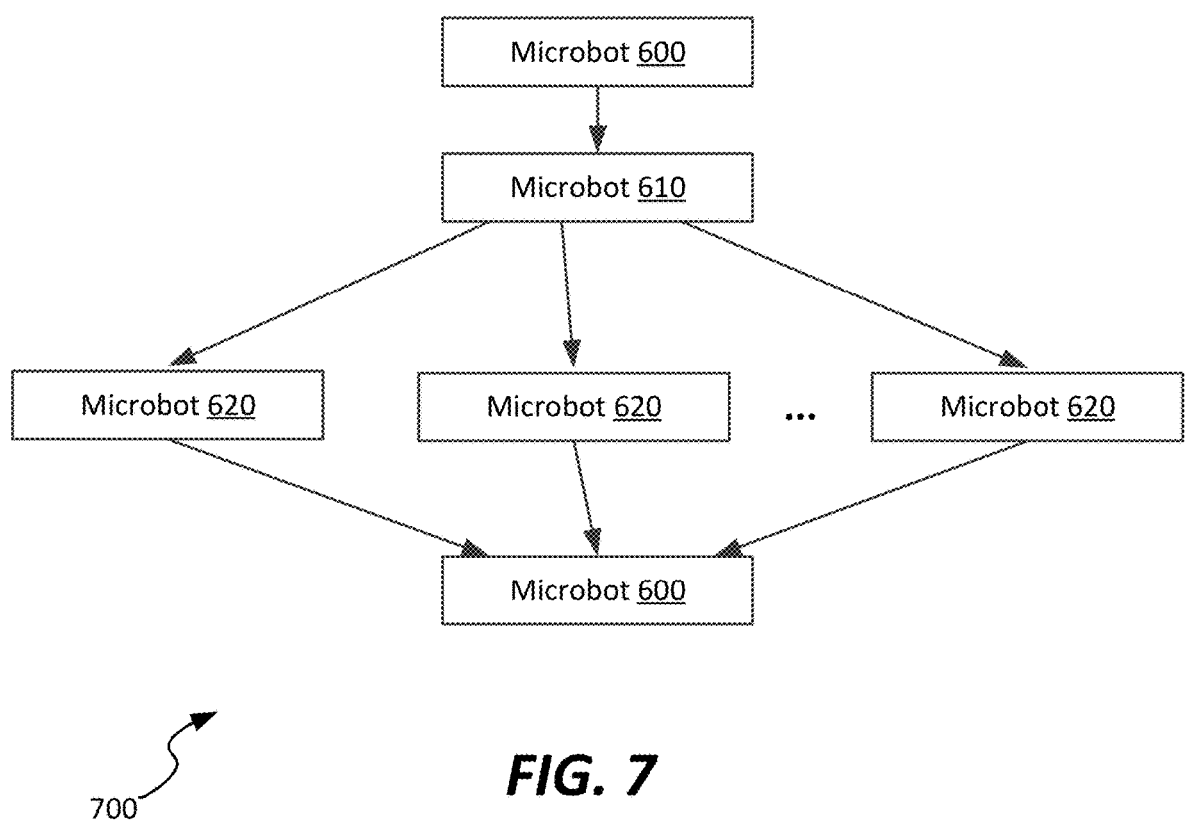
FIG. 7 illustrates an example sequence of microbot calls from an event engine to perform a plurality of business processes, according to example embodiments.

FIG. 7 illustrates an example sequence 600 of microbot calls from an event engine to perform a plurality of business processes, according to an example implementation. In this example, a business process may be performed by the platform 300 (e.g., by programmable bot engine 428 and event engine 430) calling a specific sequence of microbots to perform a business process. The sequence as illustrated includes a call to microbot 600, for example to provide an interface for access to data within a specific application on a platform requiring access as part of a business process. When microbot 600 completes execution, the platform may then have access to the application, and can call microbot 610 to perform a graphical user interface manipulation to select specific data within the application, and microbot 620 to perform one or more data operations on that data. Because data selected using microbot 610 may require substantial processing time, the platform 300 may elect to call multiple versions of microbot 620 and pass different portions of the data selected using microbot 610. Once all microbots 620 have completed execution, the platform 300 may call microbot 600 to provide an interface back to the application, e.g., for providing an interface to a different application to allow for further execution within that application.

It is recognized that the above is a relatively simplistic example of utilization of microbots, since the above discussion relates to a single data access and processing sequence for obtaining data from one application, transforming the data, and providing the transformed data to a second application; typical microbots may be far more complex, and interrelationships among them may be more complex as well. Accordingly, the use of microbots within platform 300 is widely scalable such that any number or complexity of microbots can be used for a business process, and can be assigned to that business process dynamically.

Furthermore, although in the above-referenced example some data and operational dependencies exist among the microbots enforcing a particular order, that is not necessarily the case for all business processes. For example, in one possible use of the platform 300 is to manage a vendor payment process within an organization, since such a process is typically performed frequently and involves many steps that might be automated. In such a process, an organization will typically have multiple vendors. The business may send purchase orders to multiple vendors, and will receive a shipment in response to each, that includes a receipt. It is noted that each purchase order can be fulfilled by one or multiple shipments, and therefore there may be multiple receipts per purchase order. Or, if multiple purchase orders are issued to the same vendor, that vendor may aggregate goods from multiple purchase orders into a single shipment, and therefore there may be fewer receipts per purchase order. The vendor will also issue an invoice with each shipment. To ensure correct payment of the invoice, a business process must compare the invoices against the correct purchase order and the received items on the receipt to ensure the invoice is correct prior to payment. Still further, descriptions of goods may differ between a purchase order and receipt or invoice, and various goods or services may be received with mismatched receipts, etc. Accordingly, automation of even this process may be complex.

In traditional execution of the above process (and traditional automation attempts), a designer may look at the overall process in terms of what a human would do, in a step-by-step manner—e.g., purchase order matching to receipt and invoice, one or more reconciliation operations, etc., and determine that there are, overall 10-15 steps in the overall process. Furthermore, some of those steps may include a physical step of printing a check, scanning a document, or otherwise verifying the physical presence of received goods. Additionally, with respect to automation of such a process, not only is the matching of goods to receipts to invoices difficult due to possible mismatch, even matched goods or services may not be described similarly, as noted above. To address this issue, a purchase order matching operation that is performed by a custom microbot may compare a receipt to a purchase order to find matches, but may include some textual analysis or fuzzy logic to ensure that less-than-perfect matches in description of goods and services can be considered a match. The same is true between invoices and purchase orders. Other microbots could be implemented for each step of the above process, as well as for various other operations, such as privacy law compliance, vendor payments, etc.

By way of a further example, a replenishment and inventory allocation process could be performed using a plurality of microbots. A first microbot could queue all incoming inventory to be received within the next predetermined number of days. The first microbot could scan orders and expected arrival dates, and build a schedule accordingly. A second microbot could check demand, for example by assessing demand directly as feedback from stores, or based on a demand forecast driven by an assortment plan or other demand forecasting tool. The second microbot could therefore represent an interface to such a tool that is configured to automatically retrieve demand, for example on a per-store or per-region basis. A third microbot would match inventory demand against the expected incoming supply, and apply a plurality of rules to spread the expected inventory out to the stores at which demand exists, or is the highest. A fourth microbot could look at all partially allocated inventory receipts, and adjust the inventory levels (either requested inventory, or amount of inventory allocated to each store or distribution center) based on the demand and inventory levels. In each instance, the microbot performs a discrete task, with operational flow among the microbots managed by the platform with which they are hosted.

In some examples, types of tasks performed by discrete microbots can include, for example: reading data from a document; navigating a user interface to select one or more options presented within the user interface; creating an update or notification message; performing a user action; reading EDI documents; interfacing with an email server or application; interfacing with a third-party software system (e.g., PeopleSoft, etc.), robotic document processing, or customized, process specific microbots. In a further possible example, a microbot can be created that is designed to receive a dataset and perform a PCI compliance check on that dataset. Or, as a further level of granularity, the PCI compliance can be split into sub-processes, with separate microbots for assessment of data structures, Sarbanes-Oxley compliance, or other data assessments, each performed independently and in parallel on the dataset. Other possibilities exist as well.

Figure 8:
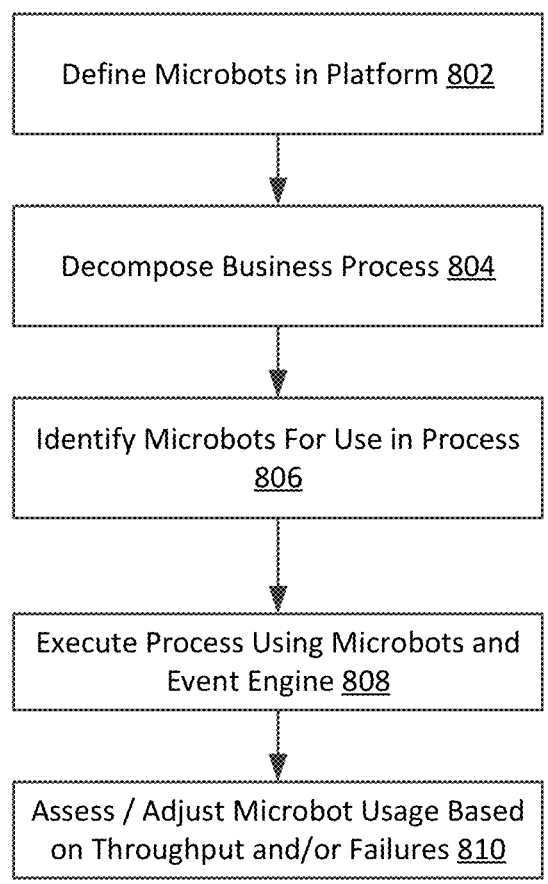
FIG. 8 illustrates a method of automating business processes including one or more physical processes, according to an example embodiment.

Referring now to FIG. 8, a method 800 of automating business processes including one or more physical processes is shown, according to an example embodiment. The method 800 can be accomplished using the microbots and platform discussed above in connection with FIGS. 1-7, and is generally used when seeking to automate processes with improved efficiency as in the present disclosure. For any given business process, the method 800 includes defining the business process in process metadata (step 802). The process metadata can be captured, for example, in the process management module 420 of the platform core.

As noted above, the business process that is the subject of automation can be any of a variety of types of business processes. Typically, the business process to be automated is a process that is executed repeatedly by an organization and including one or more inputs, one or more outputs, and a plurality of task-based operations. The task-based operations can include a physical task to be performed on an object. To implement such a business process using the platform and systems described herein, the business process is decomposed into the tasks (step 804) and, from the set of tasks, and based on the process metadata, a plurality of microbots can be selected (step 806), to perform micro-operations included in the business process. The plurality of microbots that are selected can include, among others, one or more microbots that perform at least a portion of physical tasks that are included in a business process, such as in the example order fulfillment process described above. Once the overall business process is defined, at an appropriate time (either as triggered by a particular event or user), the platform 300 can initiate execution of the business process (step 808). More specifically, an event engine within the platform 300 can initiate execution of the business process, and can call various microbots for execution based on monitored preconditions and postconditions of the various microbots included in the process being satisfied.

As noted above, the method 800 can further optionally include adjusting usage (step 810) of the microbots in case of mismatch between expected input and output in terms of pre- and post-conditions for various microbots, or for performance reasons. For example, adjustment of the overall microbot-based execution can include substitution of one microbot for another in case of a failure in execution by that microbot. This may be the case, for example, where an underlying application has changed, and therefore the microbot's interactions with the application become unexpectedly interrupted. Other adjustments to the overall usage and process could be made as well.

Figure 9:
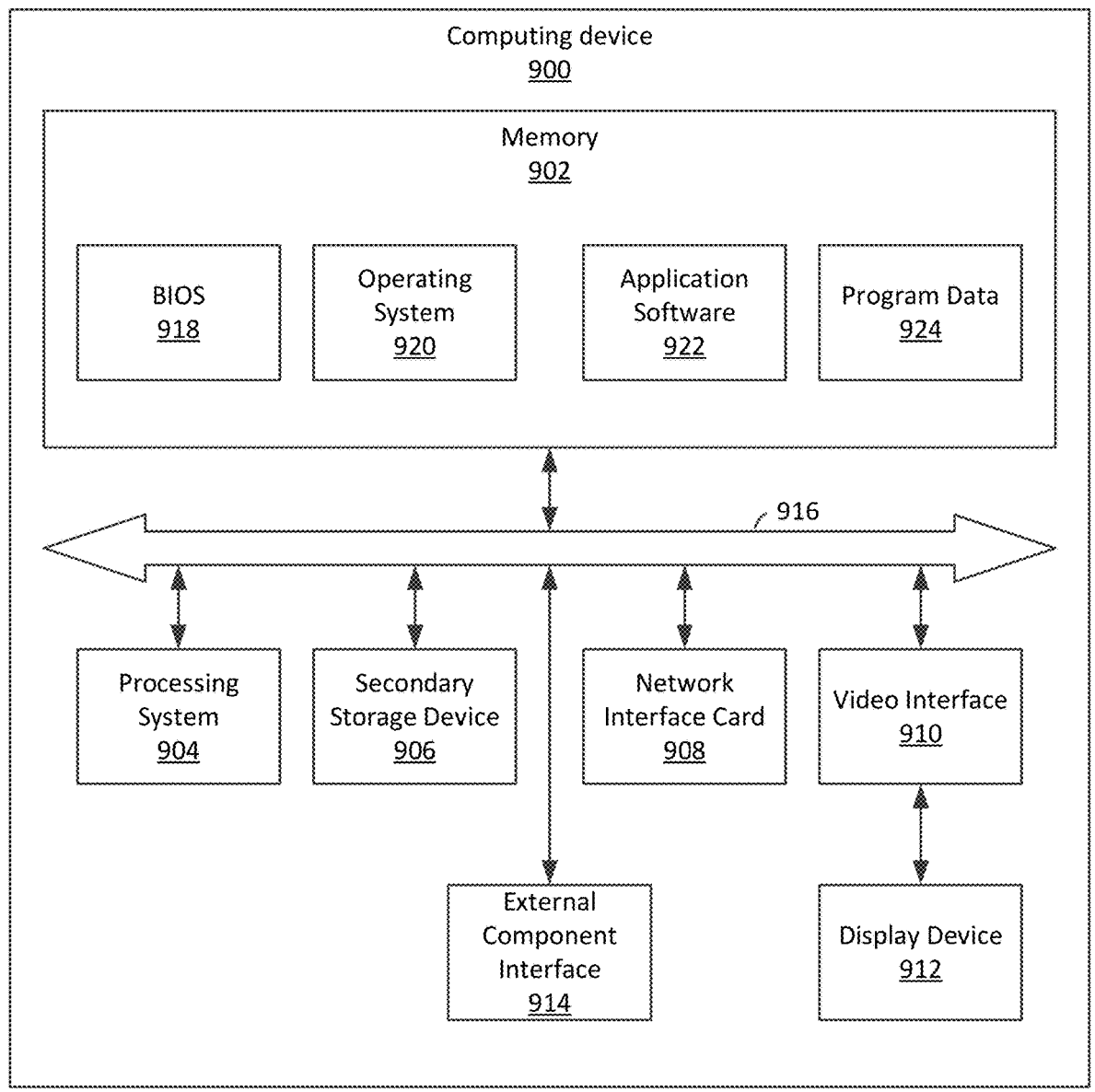
FIG. 9 illustrates a computing system with which aspects of the present disclosure can be implemented.

Referring now to FIG. 9, a schematic illustration of an example computing system 900 in which aspects of the present disclosure can be implemented. The computing device 900 can represent, for example, a computing system within which one or more of servers or computing systems, such as computing system 105, can be implemented. In particular, the computing device 900 represents the physical construct of an example computing system at which an endpoint or server could be established.

In the example of FIG. 9, the computing device 900 includes a memory 902, a processing system 904, a secondary storage device 906, a network interface card 908, a video interface 910, a display unit 912, an external component interface 914, and a communication medium 916. The memory 902 includes one or more computer storage media capable of storing data and/or instructions. In different embodiments, the memory 902 is implemented in different ways. For example, the memory 902 can be implemented using various types of computer storage media.

The processing system 904 includes one or more processing units. A processing unit is a physical device or article of manufacture comprising one or more integrated circuits that selectively execute software instructions. In various embodiments, the processing system 904 is implemented in various ways. For example, the processing system 904 can be implemented as one or more physical or logical processing cores. In another example, the processing system 904 can include one or more separate microprocessors. In yet another example embodiment, the processing system 904 can include an application-specific integrated circuit (ASIC) that provides specific functionality. In yet another example, the processing system 904 provides specific functionality by using an ASIC and by executing computer-executable instructions.

The secondary storage device 906 includes one or more computer storage media. The secondary storage device 906 stores data and software instructions not directly accessible by the processing system 904. In other words, the processing system 904 performs an I/O operation to retrieve data and/or software instructions from the secondary storage device 906. In various embodiments, the secondary storage device 906 includes various types of computer storage media. For example, the secondary storage device 906 can include one or more magnetic disks, magnetic tape drives, optical discs, solid state memory devices, and/or other types of computer storage media.

The network interface card 908 enables the computing device 900 to send data to and receive data from a communication network. In different embodiments, the network interface card 908 is implemented in different ways. For example, the network interface card 908 can be implemented as an Ethernet interface, a token-ring network interface, a fiber optic network interface, a wireless network interface (e.g., WiFi, WiMax, etc.), or another type of network interface.

The video interface 910 enables the computing device 900 to output video information to the display unit 912. The display unit 912 can be various types of devices for displaying video information, such as an LCD display panel, a plasma screen display panel, a touch-sensitive display panel, an LED screen, a cathode-ray tube display, or a projector. The video interface 910 can communicate with the display unit 912 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 914 enables the computing device 900 to communicate with external devices. For example, the external component interface 914 can be a USB interface, a FireWire interface, a serial port interface, a parallel port interface, a PS/2 interface, and/or another type of interface that enables the computing device 900 to communicate with external devices. In various embodiments, the external component interface 914 enables the computing device 900 to communicate with various external components, such as external storage devices, input devices, speakers, modems, media player docks, other computing devices, scanners, digital cameras, and fingerprint readers.

The communication medium 916 facilitates communication among the hardware components of the computing device 900. In the example of FIG. 9, the communications medium 916 facilitates communication among the memory 902, the processing system 904, the secondary storage device 906, the network interface card 908, the video interface 910, and the external component interface 914. The communications medium 916 can be implemented in various ways. For example, the communications medium 916 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 918 and an operating system 920. The BIOS 918 includes a set of computer-executable instructions that, when executed by the processing system 904, cause the computing device 900 to boot up. The operating system 920 includes a set of computer-executable instructions that, when executed by the processing system 904, cause the computing device 900 to provide an operating system that coordinates the activities and sharing of resources of the computing device 900. Furthermore, the memory 902 stores application software 922. The application software 922 includes computer-executable instructions, that when executed by the processing system 904, cause the computing device 900 to provide one or more applications. The memory 902 also stores program data 924. The program data 924 is data used by programs that execute on the computing device 900.

Although particular features are discussed herein as included within a computing device 900, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media does not include a carrier wave or other propagated or modulated data signal. In some embodiments, the computer storage media includes at least some tangible features; in many embodiments, the computer storage media includes entirely non-transitory components.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Referring to FIGS. 1-9 generally, it is noted that the methods and systems described herein have a number of advantages over existing systems. For example, maintainability is improved, because although the frequency of updates may remain the same (due to changes in process) the extent of maintenance required will be reduced, because it will typically be contained to one or more microbots, and less than the entire process would need to be addressed. Furthermore, because the microbots can include adapters that provide a layer of abstraction from underlying enterprise systems, these interfaces can readily be switched as underlying enterprise applications change with little to no effect on the existing automated process. Furthermore, throughput issues are more easily addressed by allowing microbots to execute independently based solely on preconditions managed by the platform, rather than requiring sequential execution. This enables parallel execution of tasks within the platform, where appropriate. Still other advantages are present within the platform, methods and systems, as are apparent from the present disclosure.

Embodiments of the present disclosure, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A computer implemented method of automating business processes including one or more physical processes, the method comprising:
defining a business process in process metadata, the business process being a process that is executed repeatedly by an organization and including one or more inputs, one or more outputs, and a plurality of task-based operations, at least one of the task-based operations including a physical task to be performed on an object;
based on the process metadata, selecting, by a processor, a plurality of microbots hosted by a computing platform including one or more computing systems, to perform atomic operations included in the business process, the plurality of microbots including:
a first microbot that manages operation of a device to execute a physical task on a physical document; and
a second microbot that is self-learning and that generates and provides one or more recommendations to the processor for automating at least a portion of the business process based on the availability of microbots among the plurality of microbots; and
wherein at least one of the plurality of microbots performs atomic operations for more than one business process; and
initiating execution of the business process from an event engine executed by the processor, the event engine managing execution of the plurality of microbots, data dependencies among the plurality of microbots and assigning one or more security levels for each of the plurality of microbots, wherein,
each of the plurality of microbots comprises microbot metadata defining a atomic operation performed by the microbot, interfaces of that microbot and one or more security levels corresponding to each of the business processes associated with the microbot,
each of the plurality of microbots is stateless, wherein any state transitions or data dependencies required in definition of the business process are managed by the event engine, and
execution of each of the plurality of microbots is initiated independently of the others of the plurality of microbots.

2. The method of claim 1, wherein two or more different microbots of the plurality of microbots are executed in parallel.

3. The method of claim 2, wherein the two or more different microbots of the plurality of microbots lack data dependencies therebetween in the defined business process.

4. The method of claim 1, wherein initiating execution of the business process comprises initiating a plurality of instances of execution of the business process.

5. The method of claim 4, wherein initiating the plurality of instances of execution of the business process by the event engine includes initiation of a plurality of instances of a microbot within the plurality of microbots, the plurality of instances of the microbot being executed in parallel based at least in part on throughput of the microbot.

6. The method of claim 1, further comprising, in response to a determination that a portion of the business process has changed, updating one or more of the plurality of microbots without replacing all of the plurality of microbots included in the business process.

7. The method of claim 6, wherein updating one or more of the plurality of microbots includes replacing the one or more microbots with one or more updated microbots.

8. The method of claim 1, wherein the plurality of microbots includes one or more generic microbots reusable in a plurality of different business processes, and one or more custom microbots customized to the business process.

9. A system comprising:
- a programmable circuit; and
- a memory operatively connected to the programmable circuit, the memory storing:
  - a definition of a business process in process metadata, the business process being a process that is executed repeatedly by an organization and including one or more inputs, one or more outputs, and a plurality of task-based operations, at least one of the task-based operations including a physical task to be performed on an object; and
  - instructions that, when executed by the programmable circuit, cause the system to:
    - based on the process metadata, select, by the programmable circuit, a plurality of microbots hosted by a computing platform including one or more computing systems, to perform atomic operations included in the business process, the plurality of microbots including:
      - a first microbot that manages operation of a device to execute a physical task on a physical document;
      - a second microbot that is self-learning and that generates and provides one or more recommendations to the processor for automating at least a portion of the business process based on the availability of microbots among the plurality of microbots; and
    - wherein at least one of the plurality of microbots performs atomic operations for more than one business process; and
    - initiate execution of the business process from an event engine, the event engine managing execution of the plurality of microbots and assigning one or more security levels for each of the plurality of microbots, wherein,
      - each of the plurality of microbots comprises microbot metadata defining a atomic operation performed by the microbot and one or more security levels corresponding to each of the business processes associated with the microbot,
      - each of the plurality of microbots is stateless, wherein any state transitions or data dependencies required in definition of the business process are managed by the event engine, and
      - execution of each of the plurality of microbots is initiated independently of the others of the plurality of microbots.

10. The system of claim 9, wherein the processor and memory are included in a process automation platform, the system further comprising a plurality of worker systems having a plurality of different capabilities, and wherein one or more of the plurality of microbots is configured to interface with a worker system from among the plurality of worker systems to perform one or more of the plurality of task-based operations of the business process.

11. The system of claim 10, further comprising a plurality of enterprise systems communicatively connected to the process automation platform, the plurality of enterprise systems hosting the business process.

* * * * *